United States Patent [19]

Francis

[11] 3,883,927
[45] May 20, 1975

[54] LATCHING DEVICE
[75] Inventor: Robert Charles Francis, Ottumwa, Iowa
[73] Assignee: Deere & Company, Moline, Ill.
[22] Filed: Oct. 9, 1973
[21] Appl. No.: 404,392

[52] U.S. Cl. ...................... 24/81; 292/87; 292/209; 24/73
[51] Int. Cl. ............................................. A44b 21/00
[58] Field of Search...24/81 C, 73 HH, 73 D, 73 CM, 24/73 ES, 73 RM, 221 L, 221 R, 73 C; 292/202, 204, 209

[56] References Cited
UNITED STATES PATENTS

| | | | |
|---|---|---|---|
| 2,020,206 | 11/1935 | Place | 24/73 CM |
| 2,037,301 | 4/1936 | Ball | 24/73 C |
| 3,370,873 | 2/1968 | Holton | 24/221 L |

Primary Examiner—Paul R. Gilliam
Assistant Examiner—Doris L. Troutman

[57] ABSTRACT

A latching device for releasably securing a panel-like cover member to a panel-like stationary member includes a rectangular opening in the cover member adjacent to the edge of the stationary member. A latching element is mounted in the opening and is formed from a length of wire, so that it includes a pair of adjacent, noncoaxial, connected loops. The opposite ends of the wire are formed with outwardly open hooks, which seat against opposite corners of the opening and engage the opposite sides of the cover member, the loops being deformed when the element is mounted in the opening to bias the hook elements outwardly against the edges of the opening. When the hook elements seat in one pair of opposite corners of the opening, one of the elements overlaps the edge of the stationary member to lock the members together, the latching element being shiftable to an unlatched position, wherein the opposite hook elements seat against the other pair of corners and both hook elements clear the stationary member.

8 Claims, 4 Drawing Figures

LATCHING DEVICE

BACKGROUND OF THE INVENTION

This invention relates to an improved spring-loaded latching device for removably locking a movable member to a stationary member.

Many types of latching devices have been devised to lock a removable panel or cover to a stationary panel. However, some of said devices are relatively expensive, while others have proven to be insufficiently durable, particularly where the devices are used on machines subject to vibration, such as on cover panels for agricultural or industrial machines.

SUMMARY OF THE INVENTION

According to the present invention, there is provided an improved latching device for releasably locking a removable or swingable cover panel to a fixed panel, such a latching device having particular utility on machines requiring a durable, spring-laoded latch, such as agricultural and industrial machinery.

An important feature of the invention is its simple, durable, and inexpensive construction. In addition, the novel latch is simple to operate, and does not require any tools.

DESCRIPTION OF THE PREFERRED EMBODIMENT

Figure 1:
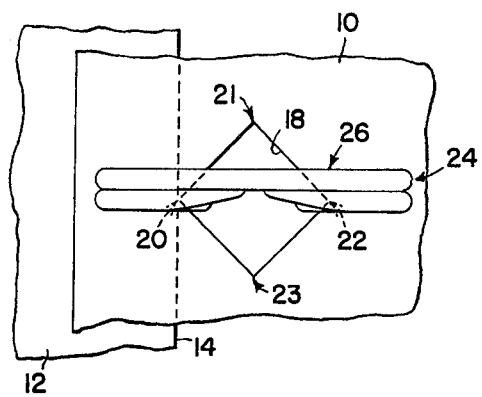
FIG. 1 is a plan view of a portion of a cover mounted on a stationary member and locked thereto by the improved latch.

The improved latching device is illustrated on a flat, removable cover or panel member 10 that is seatable against a flat stationary member 12 having an edge 14 that is overlapped by the cover 10 when it is in its closed position, the cover 10 being swingable away from the stationary member 12 about a hinge 16 parallel to the edge 14.

The cover has a square hole or opening 20 adjacent the stationary member 12, the opening having four corners indicated by the numerals 20, 21, 22 and 23. The diagonal line between the corners 20 and 22 is perpendicular to the edge 14, the corner 20 being disposed proximate to the edge 14.

Figure 2:
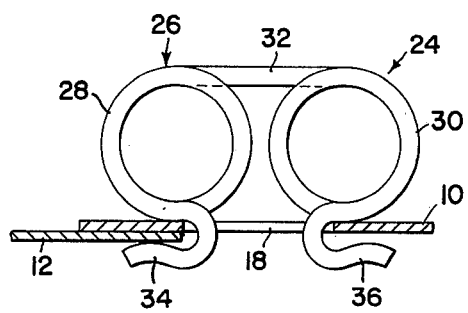
FIG. 2 is a side elevation view of the latch shown in FIG. 1.

A latch element, indicated generally by the numeral 24, is disposed in the opening 18 and is formed from a length of resilient spring wire. The latch element 24 includes a handle portion 26 disposed on top of the cover 10 and formed by a pair of adjacent loops 28 and 30 that are disposed in substantially the same vertical plane perpendicular to the cover 10 and connected by a tangential portion 32 parallel to and above the cover. As is apparent, the loops are spaced a short distance apart, and each loop contains 1 ½ turns of wire. The opposite ends of the formed wire latch element 24 are formed into hook portions 34 and 36 having openings which receive the opposite edges of the opening 18 in the cover 10, the openings in the hook portions 34 and 36 facing in opposite directions. As best seen in FIG. 2, the openings in the hook portions 34 and 36 substantially equal the thickness of the cover 10 plus the thickness of the stationary member 12 adjacent the edge 14.

In operation, the distance between opposite corners of the opening 18 is less than the distance between the opposite hook portions 34 and 36 when the latch element is in an undeflected condition, so that when the latch element is inserted into the opening 18, as shown in FIG. 2, the opposite loops 28 and 30 are slightly wound up and bias the opposite hook portions 34 and 36 away from each other against the sides of the opening, the loops 28 and 30 functioning as torsion springs. To initially assemble the latch element 24 in the opening, of course, the loops 28 and 30 have to be deformed a sufficient amount so that the ends of the hook portions 34 and 36 will clear the sides of the opening 18 and permit insertion of the latch element into the opening 18.

Figure 3:
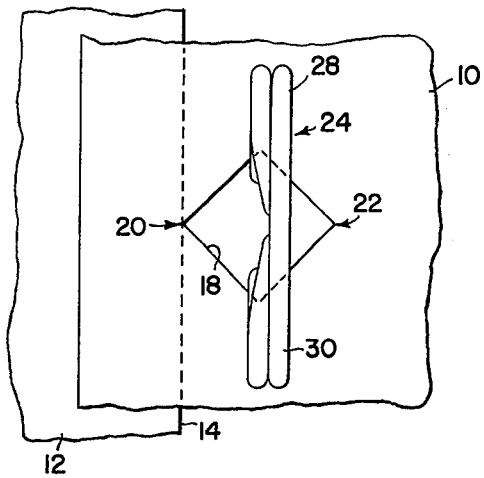
FIG. 3 is a view similar to FIG. 1, but showing the latch in an unlocked position.
Figure 4:
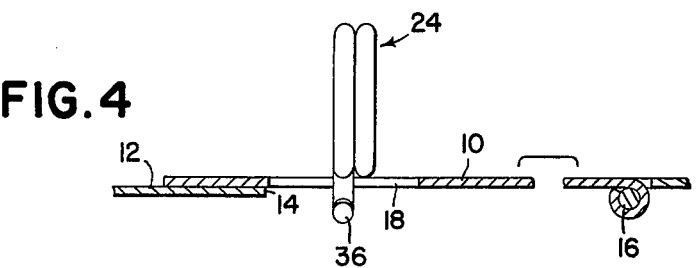
FIG. 4 is a side elevation view of the latch shown in its unlocked position, as in FIG. 4.

As is apparent, when the opposite hook portions 34 and 36 are seated in the opposite pairs of corners, either 20 and 22 or 21 and 23, the hook portions 34 and 36 are at their maximum distance apart, and since those hook portions are biased away from one another, the hook portions tend to seat in either pair of opposite corners, which function as notches to receive the hook portions. when the hook portions are respectively seated in the opposite corners 20 and 22, as shown in FIG. 1, the hook portion 34 in the corner 20 overlaps the edge 14 of the stationary member, assuming, of course, that the cover is in its closed position. Since the opening in the hook portion 34 is substantially the same as the combined thicknesses of the cover 10 and the stationary member 12, the hook portion 34 locks the cover to the stationary member, and the spring force in the latching element tends to maintain the element in its locked position. To unlock the cover, the handle portion 26 of the latch element 24 is turned 90°, to the position shown in FIG. 3, wherein the opposite hook portions 34 and 36 respectively seat in the opposite corners 21 and 23 of the opening 18, so that the hook portion 34 clears the edge 14 of the stationary member 12 to permit removal or opening of the cover 10. As is apparent, the spring force in the latching element maintains the hook portion seated in either pair of opposite corners, so that the latching element remains in either its latching position or its unlocked position until it is manually rotated with sufficient force to overcome the biasing effect of the torsion spring loops or while the loops are squeezed to relieve the spring force. As is also apparent, the latching element is made of only a single piece of spring wire, and is relatively inexpensive to manufacture and assemble into the opening 18.

I claim:

1. A latching device comprising: a first member having an edge; a second member positionable adjacent to the first member and having an opening with at least two notches, one of said notches being proximate to the edge of the first member when the first member is adjacent the second; a resiliently deformable latch element mounted in the opening and having a handle portion on one side of the second member and a pair of opposite hook elements extending through the opening and overlapping the opposite sides of said member, said handle portion being resiliently deformed when the hook elements are disposed in the opening to bias the hook elements away from each other and against the opposite side of the opening, the latch element being rotatably shiftable in the opening between a first position, wherein the opposite hook elements seat in said pair of opposite notches including said one notch and the hook element in said notch overlaps the second member and the edge of the first member when the members are adjacent each other to lock the members together, and a second position wherein said one hook element clears the first member, said shifting being accomplished upon resilient deformation of the latch elements to allow the hook elements to unseat from the notches.

2. The invention defined in claim 1 wherein the opening has at least four notches, said hook elements seating in one pair of opposite notches in the first position and a second pair of opposite notches in the second position.

3. The invention defined in claim 2 wherein the opening is polygonal and has at least four corners which form said notches.

4. The invention defined in claim 2 wherein the opening is square, and has four corners forming said notches.

5. The invention defined in claim 4 wherein the latch element is formed from an elongated spring wire, the handle portion including two separate, noncoaxial, generally coplanar loops, the hook portions being formed at the opposite ends of the wire and the loops being resiliently deformable to bias the hook portions against the opposite sides of the opening.

6. The invention defined in claim 5 wherein the first and second members include flat, relatively thin overlapping portions, and the hook elements have openings substantially equal to the thickness of said flat overlapping portions.

7. The invention defined in claim 1 wherein the latch element is formed from an elongated spring wire, the handle portion including two separate, noncoaxial, generally coplanar loops, the hook portions being formed at the opposite ends of the wire and the loops being resiliently deformable to bias the hook portions against the opposite sides of the opening.

8. The invention defined in claim 7 wherein the opening has at least four notches, said hook elements seating in one pair of opposite notches in the first position and a second pair of opposite notches in the second position.

* * * * *